United States Patent [19]

Aoyama et al.

[11] Patent Number: 5,705,784
[45] Date of Patent: Jan. 6, 1998

[54] ELECTRODE FOR ELECTRIC RESISTANCE WELDING

[76] Inventors: Yoshitaka Aoyama; Shoji Aoyama, both of 20-11, Makitsukadai 2-cho, Sakai-shi, Osaka-fu, Japan

[21] Appl. No.: 703,663

[22] Filed: Aug. 27, 1996

[30] Foreign Application Priority Data

May 11, 1996 [JP] Japan ..................... 8-152831
Jun. 22, 1996 [JP] Japan ..................... 8-196882

[51] Int. Cl.⁶ ............................................. B23K 9/24
[52] U.S. Cl. ............................................. 219/119
[58] Field of Search ..................... 219/119, 60 A

[56] References Cited

U.S. PATENT DOCUMENTS

| | | | |
|---|---|---|---|
| 2,731,535 | 1/1956 | Grey | 219/119 |
| 2,905,803 | 9/1959 | Brady, Jr. | 219/79 |
| 4,393,293 | 7/1983 | Inoue et al. | 219/90 |
| 4,609,805 | 9/1986 | Tobita et al. | 219/119 |
| 4,754,116 | 6/1988 | Naruse et al. | |
| 5,349,152 | 9/1994 | Renner | 219/99 |

*Primary Examiner*—Stuart N. Hecker
*Attorney, Agent, or Firm*—Nikaido, Marmelstein, Murray & Oram LLP

[57] ABSTRACT

An electrode for electric resistance welding comprises a guide hole of a circular cross-section composed of a small-diameter hole and a large-diameter hole, a guide pin composed of a small-diameter portion and a large-diameter portion, the small-diameter portion and larger-diameter portion of the guide pin being fitted into the small-diameter hole and large-diameter hole of the guide hole, respectively, so that when the guide pin is pushed down, compressed air is allowed to jet out of a gap between the small-diameter hole and the small-diameter portion. The large-diameter portion of the guide pin is firmly fitted into the guide hole, with an air passage formed in the outer circumference of the large-diameter portion and the end surface of the large-diameter portion seated on the inner end surface of the large-diameter hole.

9 Claims, 2 Drawing Sheets

ELECTRODE FOR ELECTRIC RESISTANCE WELDING

BACKGROUND OF THE INVENTION

1. Field of the Invention

The present invention relates to an electrode for electric resistance welding comprising a guide hole of a circular cross-section composed of a small-diameter hole and a large-diameter hole and a guide pin composed of a small-diameter portion and a large-diameter portion, the small-diameter portion and larger-diameter portion of the guide pin being fitted into the small-diameter hole and large-diameter hole of the guide hole, respectively, so that when the guide pin is displaced relative to the guide hole compressed air is allowed to jet out of a gap between the small-diameter hole and the small-diameter portion.

2. Description of Prior Art

The prior art most closely related with the present invention is described in Japanese Utility Model Publication 54-9849 and Japanese Utility Model Publication 62-32714. The former is as shown in FIG. 11, and the latter in FIG. 12. Referring first to FIG. 11, a guide hole 2 in an electrode 1 is composed of a small-diameter hole 3 and a large-diameter hole 4, a conical seat 5 connecting the cylindrical walls of the holes 3 and 4. Similarly, a guide pin 6 is composed of a small-diameter portion 7 and a large-diameter portion 8, a conical portion 9 connecting the portions 7 and 8. A coil spring 10 is inserted in the guide hole 2 to push the guide pin 6 upward. An air port 11 for introducing compressed air is formed in the electrode 1. As shown, the conical portion 9 is in tight contact with the conical seat 5 under the action of the coil spring 10. A gap 12 is provided between the small-diameter hole 3 and small-diameter portion 7. A steel plate part 13 is positioned on the electrode 1 with the guide pin 6 passing through an opening formed in the part 13 and a tapered end 15 within a threaded hole of a projection nut 14 so as to be ready for the forward movement of a movable electrode (not shown) situated above the electrode 1. The electrode 1, made of copper alloy, is composed of a main body 16 and a cap 17 integrated through threaded parts 18, the outer shape and the guide hole 2 being both circular in cross-section.

Explaining the operation in relation to FIG. 11, as the movable electrode advances to push the guide pin 6 down, the conical portion 9 is separated from the conical seat 5 to thereby allow compressed air from the air port 11 to pass through an annular gap thus formed over the conical portion and to jet out of the gap 12. As the movable electrode further advances, the projection nut 14 is pressed against the steel plate part 13, and when a welding current is turned on, the nut 14 and the steel plate part 13 are fusion-welded together. Spatter, which is produced during the process of fusion welding, is blown away by the air which jets out of the gap 12 and is prevented from entering the gap 12. The current of air also affords cooling to the electrode.

Referring to the prior art of FIG. 12, members having the same functions as in FIG. 11 are identified with same reference numerals is in FIG. 11 and their detailed description is omitted. An annular end surface, or a shoulder, 19 radially extending in a plane perpendicular to a longitudinal axis of the guide pin 6 is formed in the boundary of the large-diameter portion 8 and small-diameter portion 7, while an inner end surface, or an annular seat, 20 of the large-diameter hole 4 is formed in the boundary of the large-diameter hole 4 and small-diameter hole 3, with an O-ring for airtight sealing fitted into the large-diameter portion 8.

The operation in the FIG. 12 arrangement is similar to that described in relation to FIG. 11 with the exception that compressed air does not jet out of the gap 12 but is fed simply to push up the guide pin 6, while the air tightness is kept by the O-ring. Hence, no countermeasure against nor cooling action is contemplated in this case.

The prior art had the following problems. In the FIG. 11 arrangement, when the guide pin 6 is pushed down to separate the conical portion and the conical seat, the guide pin 6 comes to float, and therefore, the guide pin 6 can itself become eccentric in the guide hole 2 until the projection nut 14 is pressed against the steel plate part 13, causing the nut 14 to be welded to an improper position on the steel plate part 13. Moreover, unless the cone angle of the conical seat 5 and conical portion 9 is finished to an extremely high precision, the conical portion cannot come in contact with the conical seat in an airtight fashion, leading to plant air leaks which is very uneconomical.

The problem inherent in the FIG. 12 arrangement is in that no scattering of spatter nor air cooling is available. That is, no consideration is given to spatter treatment and air cooling. Although not specified in the utility model publication, in this type of guide pin, the entire surface is coated with ceramic for insulation and wear resistance. This is as shown in FIG. 13; for example, ceramic is sprayed to the surface of the guide pin 6 made of metal such as steel to form a coating later 19. In such guide pin as described the coating layer 19 with a very rigid and rough surface can be extremely worn by the small-diameter hole 3 and conical seat 5, which results in that the relative position of the guide pin 6 itself with respect to the cap 17 in the diametrical direction, that is, the centering cannot be achieved sufficiently. This problem is particularly significant when the inner surface of the small-diameter hole 3 is worn. Moreover, when the conical part 15 is worn by the corner edges of the projection nut 14 so that the coating layer 19 is worn out to the extent that the nut comes into direct contact with the metal portion, the intrinsic insulating function is sacrificed.

SUMMARY OF THE INVENTION

The invention is presented to solve the above problems, and an electrode according to claim 1 comprises a guide hole of a circular cross-section composed of a small-diameter hole and a large-diameter hole, a guide pin composed of a small-diameter portion and a large-diameter portion, the small-diameter portion and larger-diameter portion of the guide pin being fitted into the small-diameter hole and large-diameter hole of the guide hole, respectively, so that when the guide pin is displaced relative to the guide hole, compressed air introduced from a port formed in the electrode is allowed to jet out of a gap between the small-diameter hole and the small-diameter portion, wherein the large-diameter portion of the guide pin is firmly fitted into the large-diameter hole to form a guide portion, an end surface of the guide portion and an inner end surface of the large-diameter hole coming in contact with each other, and wherein an air passage is formed in the guide portion in the axial direction of guide pin. Usually the end surface of the guide portion is in contact with the inner end surface of the large-diameter hole to completely shut off the compressed air. As the guide pin is displaced by a forward movement of a movable electrode, the entire guide pin moves smoothly, without deflection of its axis, which is due to the axial center setting function of the guide portion. As a result of the displacement of the guide pin, the end surface of the guide portion and the inner end surface of the large-diameter hole part to thereby allow the compressed air to jet out of the gap over the small-diameter portion.

According to claim 2, the guide hole has a medium-diameter hole formed between the small-diameter hole and large-diameter hole so that the large-diameter hole and the medium-diameter hole provide a principal inner end surface and a subsidiary inner end surface, respectively, wherein the guide pin has a medium-diameter portion formed between the small-diameter portion and large-diameter portion, so that the large-diameter portion and the medium-diameter portion provide a principal end surface and a subsidiary end surface, respectively, and wherein the principal end surface or subsidiary end surface of the guide portion or both come in surface and contact in an airtight fashion with the principal inner end surface or the subsidiary inner end surface or both, respectively.

According to claim 3, the medium-diameter portion of the guide pin is firmly fitted into the medium-diameter hole of the guide hole, the length over which the medium-diameter portion and the medium-diameter hole coexist being set shorter than the length by which the guide pin is displaced during the welding. The firm fitting blocks distribution of air in the medium-diameter portion to keep a highly airtight state. As the guide pin is displaced, the medium-diameter portion slides out of the medium-diameter hole to thereby allow the compressed the circulation route for the air to pass therethrough the axial center setting function of the guide portion ensures that the medium-diameter portion slides into and out of the medium-diameter hole.

According to claims 4 and 5, the air passage is provided by a flat portion formed on the outer circumference of the guide portion, so that the compressed air passes through the flat portion.

According to claim 6, the air passage is provided by a recess formed in the outer circumference of the guide portion, so that the compressed air passes through the recess.

According to claim 7, the small-diameter portion of the guide pin is made of metal, the large-diameter portion is made of synthetic resin, and the electrode is a metal of excellent electric conductivity, whereby the end surface of the guide portion is seated on the inner end surface of the metal with the softness of the synthetic resin, and the contact fitness, or conformability, in this contact region is excellent making airtight sealing secure.

In another embodiment of the invention, an electrode has a guide pin retained in a guide hole formed in the guide pin. The guide pin comprises a metal-made guide member adapted to extend through an opening in a plate form part and a non-metallic seal member integral with the guide member, wherein the seal member is composed of a cylindrical protective part larger in diameter than the guide member, a base part larger in diameter than the protective part, and a conical part connecting the protective and base parts, ventilation gaps being formed between the protective part and the guide hole and between the base part and the guide hole, respectively since the seal member is made of material such as synthetic resin, occurrence of abnormal wear in the guide hole parts of the electrode can be avoided, and in particular the protective part prevents abnormal wear of inner surface of the small-diameter hole.

The guide member may advantageously has a hollow space formed therein to receive a projection bolt, functioning the same as described in relation to the projection nut.

DESCRIPTION OF THE PREFERRED EMBODIMENTS

Figure 1:
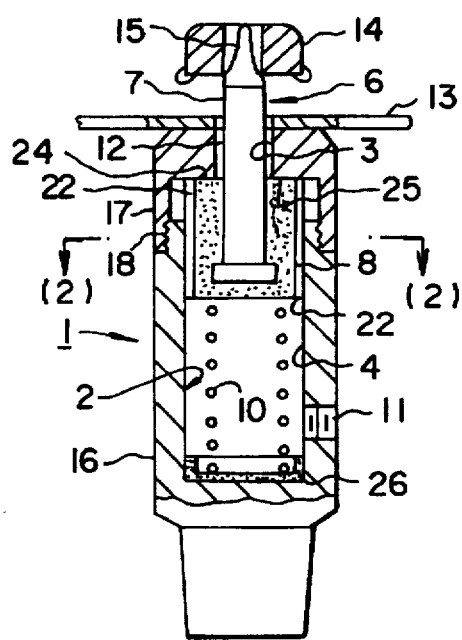
FIG. 1 is a longitudinal sectional view showing an embodiment of the invention.
Figure 2:
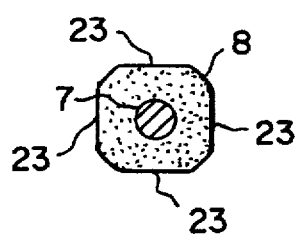
FIG. 2 is a cross-sectional view taken along the line (2)—(2) in FIG. 1.
Figure 11:
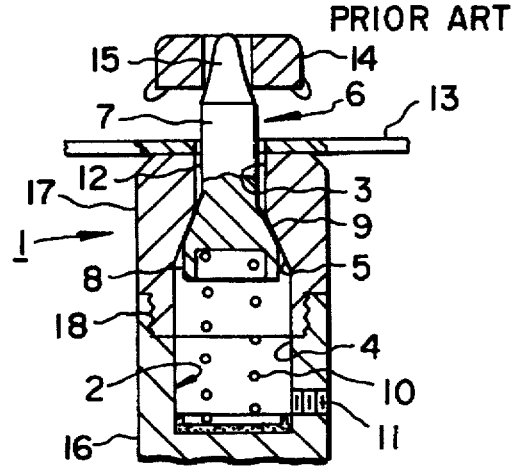
Figure 13:
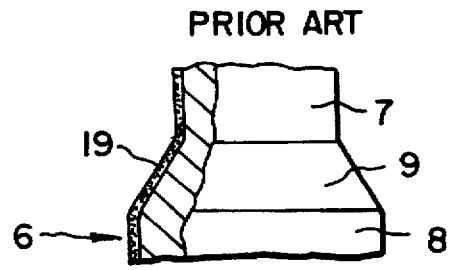
FIG. 13 is a partial sectional view showing a coating layer of a guide pin.

Illustrated embodiments of the invention will now be described. First, an embodiment shown in FIG. 1 and FIG. 2 is described, in which components having the same functions as the members described in relation to FIG. 11 and FIG. 13 are identified with same reference numerals and detailed descriptions are omitted. A small-diameter portion 7 of a guide pin 6 is made of stainless steel, while a large-diameter portion 8 is made from a synthetic resin such as glass fiber filled Teflon and nylon. The small-diameter portion 7 and large-diameter portion 8 may be integrated in various ways; e.g., through screw threads, using a nut and, as is in this case, by molding the large-diameter portion 8 together with the small-diameter portion 7. An air passage 22 extending in the axial direction of the guide pin is provided, as is clear from FIG. 2, by forming a flat portion 23. A Cap 17 and a main body 16 are made of conductive metal, such as copper alloy.

The large-diameter portion 8 is firmly fitted into a guide hole 2 of a circular cross-section. By "firmly" it is meant that the large-diameter portion 8 is longitudinally slidable in the guide hole 2, substantially without gap therebetween. In other words, without air passage 22, the large-diameter portion slides with very slight or no attendant flow of air. This is advantageous in that the entire guide pin 6 is not inclined even slightly, without only run-out and eccentricity. The large-diameter portion 8 serves as the guide portion, and the guide portion is also identified with reference numeral 8. The end surface 24 of the guide portion 8 and the inner end surface 25 of the large-diameter hole 4 come in contact with each end surface in a plane perpendicular to the longitudinal axis of the guide pin 6. Reference numeral 26 indicates an insulation plate.

As for the dimensions of the electrode, in the case of the projection nut as shown in the drawing, generally, the diameter of the electrode is 25 mm, the overall length of the electrode is 85 mm, and the diameter of the guide pin small-diameter portion is 7 mm.

Explaining the operation of this embodiment, FIG. 1 shows a state in which the guide pin 6 is pushed upward by the pressure of compressed air introduced from the port 11 and tension of the coil spring 10, so that the end surface 24 is firmly seated on the inner end surface 25 to completely shut the compressed air off. As a movable electrode, not shown, moves forward to gush down the nut 14, the surfaces 24 end 25 part to allow the compresses air to pass through the air passage 22 and between the surfaces 24 and 25, and then to jet out of the gap 12. In this state, the nut 14 is pressed against the steel plate part 13 end a welding current is turned on to complete the welding, the spatter splashing at this time being scattered by the compressed air so as not to enter the gap 12. The welding heat is cooled by the current of air. During this operation, since the guide portion 8 is firmly fitted into the guide hole 4 without runout or eccentricity, the gap 12 is maintained uniformly over the entire circumference, ensuring uniform jets of air, while the position of the nut 14 relative to the steel plate part 13 is set correctly.

Figure 4:
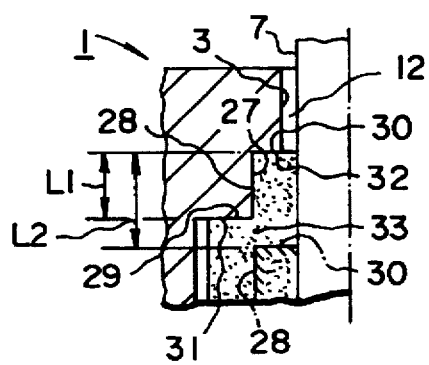
FIG. 4 is a partly magnified longitudinal sectional view of the embodiment in FIG. 3.
Figure 3:
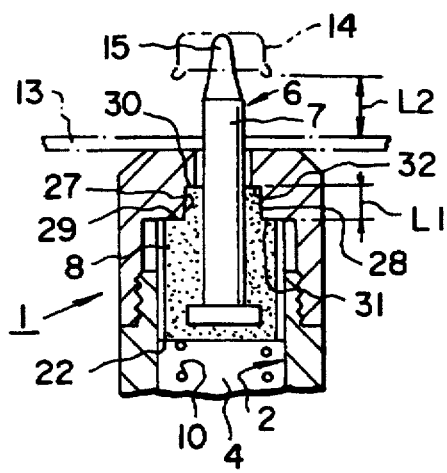
FIG. 3 is a partial longitudinal sectional view showing other embodiment.

FIG. 3 end FIG. 4 show e modification in which a medium-diameter hole 27 is formed between the small-diameter hole 3 and large-diameter hole 4 of the guide hole 2 thus providing a principal inner end surface 31 and a subsidiary inner end surface 32. Similarly, a medium-diameter portion 28 is formed between the small-diameter portion 7 and large-diameter portion 8 of the guide pin 6 thus providing, principal end surface 29 and subsidiary end surface 30. Although one medium-diameter portion is provided in the embodiment shown, two or more medium-diameter portions may be provided. The principal end surface 29 or subsidiary end surface 30 of the guide portion 8 or both are designed to come in contact with the principal inner end surface 31 or the subsidiary inner end surface 32 of the large-diameter hole 4 or both, respectively.

The medium-diameter portion 28 of the guide pin is fitted firmly into the medium-diameter hole 27 of the guide hole. The axial length L1 over which they coexist is set shorter than the length L2 by which the guide pin 7 is displaced during the welding. As shown by the phantom line in FIG. 4, when the medium-diameter portion 28 slides out of the medium-diameter hole 27, a passage 33 is formed. The returning to the initial state, or the sliding of the portion 28 into the hole 27, facilitated by the centering function of the guide portion 8.

Figure 5:
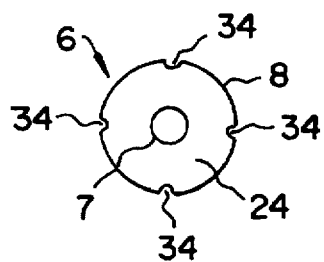
FIG. 5 is a plan view showing recesses formed in a guide portion.
Figure 6:
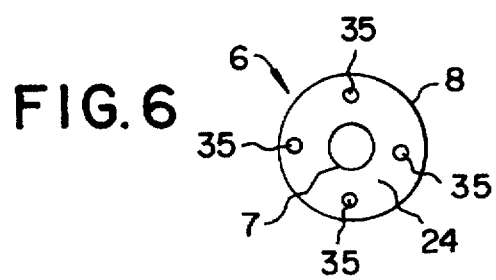
FIG. 6 is a plan view showing through holes formed in a guide portion.

FIG. 5 and FIG. 6 show, respectively, modifications of the air passage 22. In the modification shown in FIG. 5, four axially extending recesses 34 are formed in the outer surface of the guide portion 8. Alternatively, in FIG. 6, four axially extending through holes 35 are formed near the outer circumference of the guide portion 8, each hole 35 opening at opposite end surfaces of the guide portion 8.

Figure 7:
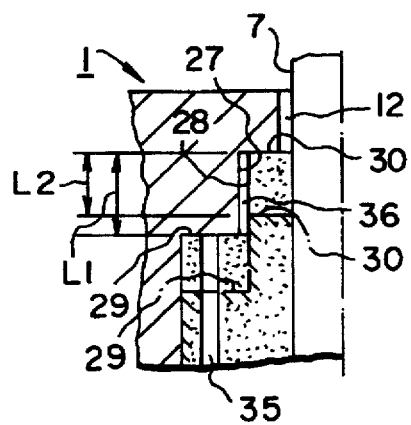
FIG. 7 is a partial longitudinal sectional view similar to FIG. 4 showing a different embodiment.

In modification shown in FIG. 7, the medium-diameter hole 27 and medium-diameter portion 28 are not fitted firmly, but rather there is a gap 36 while the length L1 is longer Than the length L2 as opposed to the FIG. 4 embodiment.

As has been described so far, the guide portion of the guide pin fits firmly into the large-diameter portion of the guide hole, and the end surface of the guide portion and the inner end surface of the large-diameter portion come in contact with each other, plane to plane, ensuring airtightness without the need for complicated taper surface processing as in the prior art. Moreover, the guide portion is fitted so that any run-out or eccentricity of the guide pin can not occur, and therefore, non only the gap in the region of the small-diameter portion is maintained uniformly over the whole circumference, but also the positioning of the projection nut relative to the steel plate part is kept at high precision. The surface contact, or plane to plane contact, achieved by employing a stepped structure for the guide hole and a corresponding stepped structure for guide pin is very advantageous for keeping airtight.

Since the medium-diameter portion fits closely inside the medium-diameter hole, the airtight keeping function is achieved in this fitting area. Even if foreign matter is caught between the end surfaces for some reason, leak of air is prevented by the airtight keeping function of the fitting area. Besides, the guide portion is responsible for centering function, to ensure that the medium-diameter portion slides in and out the medium-diameter hole very smoothly.

Since the large-diameter portion of the guide pin is made of synthetic resin, the air passage can be formed by the molding technique, which is very advantageous in manufacture. In the case where the air passage is formed by cutting, machinability is excellent and it is similarly beneficial. The end surface of synthetic resin is seated on the inner end surface of the large-diameter hole of the electrode which is made of metal, and therefore the initial fitting-in, or conformability, on the part of the synthetic resin is promoted, ensuring the air tightness.

In addition, the seating surfaces are each in a plane perpendicular to the axis of the guide pin, facilitating processing with precision, and hence it is advantageous for enhancement of air tightness. The length of the guide portion is about halt the overall length of the guide pin, and hence very stable action is realized for prevention of run-out and eccentricity.

Another embodiment of the invention will now be described referring to in FIG. 8 and FIG. 9, in which those having the same functions as the members previously described are identified with same reference numerals, detailed description being omitted. A guide pin 6 is composed of a metal-made guide member 37, and a non-metallic seal member 38 integral with the guide member 37. The seal member 38 is composed of a protective part 39 which is larger in diameter than the guide member 37, a base part 41 which is larger in diameter than the protective part 39, and a conical part 40 connecting the protecting part 39 and the base part 41. Ventilation gaps 42 and 43 are formed between the protective part 39 and small-diameter hole 3, and between the base part 41 and large-diameter hole 4, respectively. The electrode 1 and guide pin 6 are both circular in cross-section.

A shaft part 44 is formed integrally with the guide member 37 and extends through the seal member 38 with a nut 45 tightened to a threaded end thereof, so that the guide member 37 and seal member 38 are integrated. The base part 41 is in the form of a skirt as shown in FIG. 9 with a coil spring 10 acting on a seat 46 formed in the base part. The guide member 37 is made of stainless steel or its alloy. The seal member 38 is most appropriately composed of a synthetic resin such as a glass fiber filled Teflon and nylon. As examples of dimensions of parts, diameter of the guide member 37, protective part 39, and base part 41 is respectively 6 mm, 8 mm, and 20 mm, and the ventilation gaps 25, 26 are 0.5 mm, and the overall length of the guide pin 6 is 38 mm.

Figure 10:
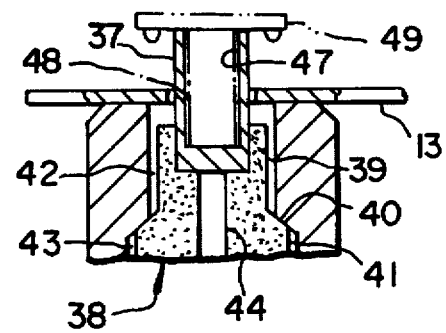
FIG. 10 is a partial longitudinal sectional view showing a modification of the guide pin.

A modified form is shown in FIG. 10 in which the guide member 37 is hollow, reference numeral 47 denoting a hollow space. The part to be handled here is a projection bolt with a shaft 48 and a flange 49 integral with the shaft.

Figure 8:
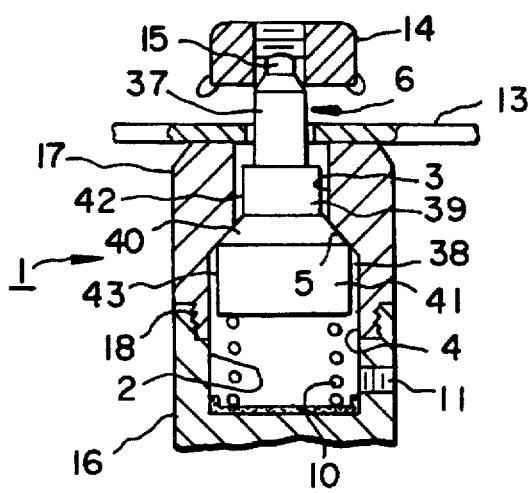
FIG. 8 is a longitudinal sectional view showing another embodiment of the invention.
Figure 9:
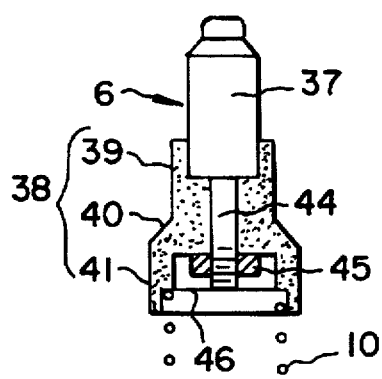
FIG. 9 is a longitudinal sectional view of a guide pin.
Figure 12:
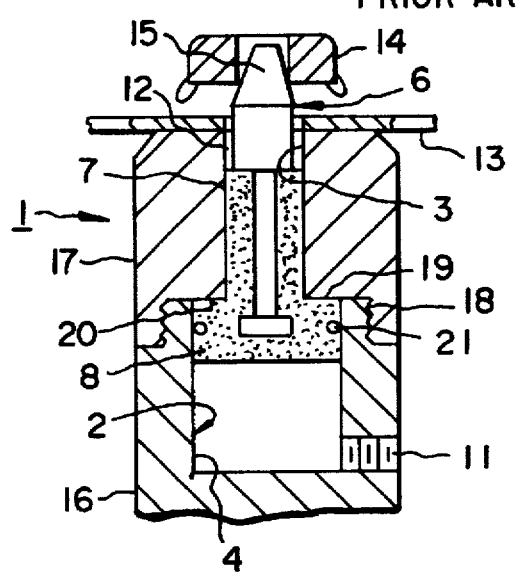
FIG. 11 and 12 are longitudinal sectional views showing prior

FIG. 8 shows the state in which the circulation of air is blocked by the conical part 40 brought into contact with the seat 5 by the action of compressed air from port 11. When the nut 14 or the flange 32 is pushed down as a result of the downward movement of a movable electrode (not shown), the conical part 40 is spaced apart from the seat 5, allowing the compressed air to flow through the ventilation gaps 26 and 25 and out of the opening in the plate-form part 13. The current of compressed air not only prevents spatter from entering the opening but also affords cooling.

As has been described so far, since the conical part of non-metallic material is brought into tight contact with the metal-made seat, a valve action of high sealing effect is obtained by the fitness, or conformability, of the conical part. Moreover, since the protective part is non-metallic and is larger in diameter than the guide member, there is no metal to metal contact between the guide member and small-diameter hole, and hence the guide member will not wear the inner surface of the small-diameter hole. In this way, the ventilation gaps are always kept at a constant value and the durability of the electrode itself can be notably extended. If the metal-made guide member is slightly worn, the insulating function is achieved by the non-metallic seal member, and short-circuit of welding current does not take place.

Besides, a hollow space formed in the guide member facilitates the welding of the projection bolt and the like.

What is claimed is:

1. An electrode for electric resistance welding, comprising a guide hole of a circular cross-section composed of a small-diameter hole and a large-diameter hole, a guide pin composed of a small-diameter portion and a large-diameter portion, the small-diameter portion and larger-diameter portion of the guide pin being fitted into the small-diameter hole and large-diameter hole of the guide hole, respectively, so that when the guide pin is displaced relative to the guide hole, compressed air introduced from a port formed in the electrode is allowed to jet out of a gap between the small-diameter hole and the small-diameter portion, wherein the large-diameter portion of the guide pin is firmly fitted into the large-diameter hole to form a guide portion, an end surface of the guide portion and an inner end surface of the large-diameter hole coming in contact with each other, and wherein an air passage is formed in the guide portion in the axial direction of the guide pin.

2. An electrode for electric resistance welding of claim 1, wherein the guide hole has a medium-diameter hole formed between the small-diameter hole and large-diameter hole, so that the large-diameter hole and the medium-diameter hole provide a principal inner end surface and a subsidiary inner end surface, respectively, wherein the guide pin has a medium-diameter portion formed between the small-diameter portion and large-diameter portion so that the large-diameter portion and the medium-diameter portion provide a principal end surface and a subsidiary end surface, respectively, and wherein the principal end surface or subsidiary end surface of the guide portion or both come in contact with the principal inner end surface or the subsidiary inner end surface or both, respectively.

3. An electrode for electric resistance welding of claim 2, wherein the medium-diameter portion of the guide pin is firmly fitted into the medium-diameter hole of the guide hole, length over which the medium-diameter portion and the medium-diameter hole coexist being set shorter than length by which the guide pin is displaced during the welding.

4. An electrode for electric resistance welding of claim 1, wherein the air passage is formed by providing a flat portion on the outer circumference of the guide portion.

5. An electrode for electric resistance welding of claim 2, wherein the air passage is formed by providing a flat portion on the outer circumference of the guide portion.

6. An electrode for electric resistance welding of claim 1, wherein the air passage is formed by providing a recess in the outer circumference of the guide portion.

7. An electrode for electric resistance welding of claim 1, wherein the small-diameter portion of the guide pin is made of metal, the large-diameter portion is made of synthetic resin, and the electrode is of a metal of excellent electric conductivity.

8. A welding electrode for fusion-welding a part to a mating plate-form part, having a guide pin retained in a guide hole formed therein, said guide pin comprising a metal-made guide member adapted to pass through an opening in the plate form part and a non-metallic seal member integral with the guide member, wherein the seal member is composed of a cylindrical protective part larger in diameter than the guide member, a cylindrical base part larger in diameter than the protective part, and a conical part connecting the protecting part and the base part, ventilation gaps being formed between the protective part and the guide hole and between the base part and the guide hole, respectively.

9. A guide pin of welding electrode of claim 8, wherein the guide portion is hollow.

* * * * *